(12) United States Patent
Pescatore

(10) Patent No.: US 6,321,296 B1
(45) Date of Patent: Nov. 20, 2001

(54) SDRAM L3 CACHE USING SPECULATIVE LOADS WITH COMMAND ABORTS TO LOWER LATENCY

(75) Inventor: John Carmine Pescatore, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/128,707

(22) Filed: Aug. 4, 1998

(51) Int. Cl.⁷ ...................................................... G06F 12/00
(52) U.S. Cl. ........................... 711/118; 711/117; 711/137; 711/154
(58) Field of Search ................................... 711/118, 137, 711/100, 3, 117, 154

(56) References Cited

U.S. PATENT DOCUMENTS

| | | | |
|---|---|---|---|
| 5,761,708 | * 6/1998 | Cherabuddi et al. | 711/118 |
| 5,778,436 | * 7/1998 | Kedem et al. | 711/137 |
| 5,926,831 | * 7/1999 | Revilla et al. | 711/137 |
| 6,016,543 | * 1/2000 | Suzuki et al. | 712/233 |
| 6,044,035 | * 3/2000 | Kohno | 365/230.06 |
| 6,049,493 | * 4/2000 | Kitamoto et al. | 365/203 |

* cited by examiner

Primary Examiner—Tuan V. Thai
(74) Attorney, Agent, or Firm—Bracewell & Patterson, LLP

(57) ABSTRACT

A computer system having a cache for providing data to the system's processing unit(s), wherein the cache controller selectively aborts speculative accesses to its data array. The cache initiates a transfer of data by speculatively transmitting an associated address to the data array, and the data transfer is aborted in response to an intervening determination that the data is to be provided by another source, e.g., by the system memory device (a cache miss) or, in a multi-processor computer wherein the cache is an L3 cache supporting several processing units, by another processing unit which holds the data in a modified state. The data array is arranged in rows and columns, and accessed using a row address strobe (RAS) signal and a column address strobe (CAS) signal. The cache initiates the data transfer by driving a RAS signal associated with the address, and the data transfer is aborted prior to driving a CAS signal associated with the address. The cache registers a state for a memory bank associated with the address, indicating that the memory bank requires a precharge, and later sends a precharge command to the memory bank. By aborting unnecessary data transfers, the L3 data bus is freed up to allow successful speculative access of other cache lines.

17 Claims, 3 Drawing Sheets

SDRAM L3 CACHE USING SPECULATIVE LOADS WITH COMMAND ABORTS TO LOWER LATENCY

BACKGROUND OF THE INVENTION

1. Field of the Invention

The present invention generally relates to computer systems, particularly to a method of improving the performance of a computer system having a memory hierarchy which includes one or more cache levels, and more specifically to a method of using speculative loads for L3 caches with command aborts to lower memory latency.

2. Description of Related Art

The basic structure of a conventional computer system 10 is shown in FIG. 1. Computer system 10 may have one or more processing units, two of which 12a and 12b are depicted, which are connected to various peripheral devices, including input/output (I/O) devices 14 (such as a display monitor, keyboard, and permanent storage device), memory device 16 (such as random access memory or RAM) that is used by the processing units to carry out program instructions, and firmware 18 whose primary purpose is to seek out and load an operating system from one of the peripherals (usually the permanent memory device) whenever the computer is first turned on. Processing units 12a and 12b communicate with the peripheral devices by various means, including a generalized interconnect or bus 20. Computer system 10 may have many additional components which are not shown, such as serial and parallel ports for connection to, e.g., modems or printers. Those skilled in the art will further appreciate that there are other components that might be used in conjunction with those shown in the block diagram of FIG. 1; for example, a display adapter might be used to control a video display monitor, a memory controller can be used to access memory 16, etc. Also, instead of connecting I/O devices 14 directly to bus 20, they may be connected to a secondary (I/O) bus which is further connected to an I/O bridge to bus 20. The computer can have more than two processing units.

In a symmetric multi-processor (SMP) computer, all of the processing units are generally identical, that is, they all use a common set or subset of instructions and protocols to operate, and generally have the same architecture. A typical architecture is shown in FIG. 1. A processing unit includes a processor core 22 having a plurality of registers and execution units, which carry out program instructions in order to operate the computer. An exemplary processing unit includes the PowerPC™ processor marketed by International Business Machines Corp. The processing unit can also have one or more caches, such as an instruction cache 24 and a data cache 26, which are implemented using high speed memory devices. Caches are commonly used to temporarily store values that might be repeatedly accessed by a processor, in order to speed up processing by avoiding the longer step of loading the values from memory 16. These caches are referred to as "on-board" when they are integrally packaged with the processor core on a single integrated chip 28. Each cache is associated with a cache controller (not shown) that manages the transfer of data between the processor core and the cache memory.

A processing unit 12 can include additional caches, such as cache 30, which is referred to as a level 2 (L2) cache since it supports the on-board (level 1) caches 24 and 26. In other words, cache 30 acts as an intermediary between memory 16 and the on-board caches, and can store a much larger amount of information (instructions and data) than the on-board caches can, but at a longer access penalty. For example, cache 30 may be a chip having a storage capacity of 256 or 512 kilobytes, while the processor may be an IBM PowerPC™ 604-series processor having on-board caches with 64 kilobytes of total storage. Cache 30 is connected to bus 20, and all loading of information from memory 16 into processor core 22 usually comes through cache 30. Although FIG. 1 depicts only a two-level cache hierarchy, multi-level cache hierarchies can be provided where there are many levels of interconnected caches.

A cache has many "blocks" which individually store the various instructions and data values. The blocks in any cache are divided into groups of blocks called "sets" or "congruence classes." A set is the collection of cache blocks that a given memory block can reside in. For any given memory block, there is a unique set in the cache that the block can be mapped into, according to preset mapping functions. The number of blocks in a set is referred to as the associativity of the cache, e.g. 2-way set associative means that for any given memory block there are two blocks in the cache that the memory block can be mapped into; however, several different blocks in main memory can be mapped to any given set. A 1-way set associate cache is direct mapped, that is, there is only one cache block that can contain a particular memory block. A cache is said to be fully associative if a memory block can occupy any cache block, i.e., there is one congruence class, and the address tag is the full address of the memory block.

An exemplary cache line (block) includes an address tag field, a state bit field, an inclusivity bit field, and a value field for storing the actual instruction or data. The state bit field and inclusivity bit fields are used to maintain cache coherency in a multi-processor computer system (indicate the validity of the value stored in the cache). The address tag is a subset of the full address of the corresponding memory block. A compare match of an incoming address with one of the tags within the address tag field indicates a cache "hit." The collection of all of the address tags in a cache (and sometimes the state bit and inclusivity bit fields) is referred to as a directory, and the collection of all of the value fields is the cache entry array.

When all of the blocks in a congruence class for a given cache are full and that cache receives a request, whether a "read" or "write," to a memory location that maps into the full congruence class, the cache must "evict" one of the blocks currently in the class. The cache chooses a block by one of a number of means known to those skilled in the art (least-recently used (LRU), random, pseudo-LRU, etc.) to be evicted. If the data in the chosen block is modified, that data is written to the next lowest level in the memory hierarchy which may be another cache (in the case of the L1 or on-board cache) or main memory (in the case of an L2 cache, as depicted in the two-level architecture of FIG. 1). By the principle of inclusion, the lower level of the hierarchy will already have a block available to hold the written modified data. However, if the data in the chosen block is not modified, the block is simply abandoned and not written to the next lowest level in the hierarchy. This process of removing a block from one level of the hierarchy is known as an "eviction". At the end of this process, the cache no longer holds a copy of the evicted block.

In an SMP system with CPUs running at very high frequencies, system performance can be highly sensitive to main memory latency. One method to reduce latency is to use an L3 cache which is shared by multiple CPUs in the system. Since many of today's CPUs have fairly large L2 caches, the shared cache (L3 cache) must be very large to have a marked impact on system performance. Unfortunately, large L3 caches built from static RAM (SRAM) can be quite expensive. A more cost-effective approach is to use synchronous dynamic RAM (SDRAM). The primary drawback with SDRAM is a longer latency and a cycle time of a given memory bank, which can be ten times or so greater than that for high speed SRAM. The cycle time problem can be alleviated by employing many banks in the L3 cache such that the probability of accessing a busy bank is low. However, the latency is still fairly high, and thus the access should start as soon as possible.

In an SMP system, load requests coming from a given CPU can be satisfied (i) by another CPU if the memory value is held in one of the CPU's caches (e.g., held in a modified or exclusive coherency state using a MESI coherency protocol), (ii) by main memory, or (iii) by a shared cache (in this example a level 3 or L3 cache). One method to reduce latency of data supplied by the L3 cache is to access L3 data speculatively. In other words, the L3 data array is accessed in parallel with the directory and before the transaction snoop responses are known from the other CPUs. This approach can have the advantage of getting the data to the requesting CPU in the minimum amount of time in a system with low system bus utilization. However, when the system is highly utilized, there can be a significant amount of L3 data bandwidth wasted on L3 misses, or hits to modified data in another CPU's L2 cache. The net effect of the increased bandwidth usage can actually be higher average latency. To avoid this problem, the L3 cache access can be delayed until after the directory lookup and snoop responses are known. However, serially accessing the directory can also add a non-trivial amount of latency to data sourced by the L3 cache.

In light of the foregoing, it would be desirable to devise an improved method of using speculative accesses to an L3 cache to obtain low latency loads, wherein the data transfer phase could be aborted to prevent L3 misses and/or L2 modified data snoop hits from squandering precious L3 data bandwidth. It would be further advantageous if the method were able to compensate for the possibility that the speculative accesses to the L3 cache might result in more overall L3 activity.

SUMMARY OF THE INVENTION

It is therefore one object of the present invention to provide an improved cache architecture to be used by a computer system.

It is another object of the present invention to provide such an improved cache architecture adapted for use with a symmetric multi-processor (SMP) computer system, wherein at least one shared cache (e.g., an L3 cache) supports a plurality of CPUs each having a separate cache (e.g., an L2 cache).

It is yet object of the present invention to provide such an improved cache architecture which reduces memory latency by allowing speculative accesses of data in the lower level (L3) cache.

The foregoing objects are achieved in a computer system generally comprising at least one processing unit, a memory device, a cache for providing data to the processing unit, the cache having a data array, and means for selectively aborting speculative accesses to the data array. The cache controller initiates a transfer of the data by speculatively transmitting an address associated with the data to the data array, in response to an address, and the data transfer is aborted in response to an intervening determination that the data is to be provided by a source other than the cache means, e.g., by the system memory device (a cache miss) or, in a multi-processor computer wherein the cache is an L3 cache supporting several processing units, by another processing unit which holds the data in a modified state.

In an illustrative embodiment, the data array has contents are arranged in rows and columns, and is accessed using a row address strobe (RAS) signal and a column address strobe (CAS) signal; the cache means initiates the data transfer by driving a RAS signal associated with the address, and the data transfer is aborted prior to driving a CAS signal associated with the address. The cache registers a state for a memory bank associated with the address, indicating that the memory bank requires a precharge, in response to the determination that the data is to be provided by the other source, and later sends a precharge command to the memory bank. By aborting unnecessary data transfers, the L3 data bus is freed up to allow the successful speculative access of other cache lines.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

Figure 1:
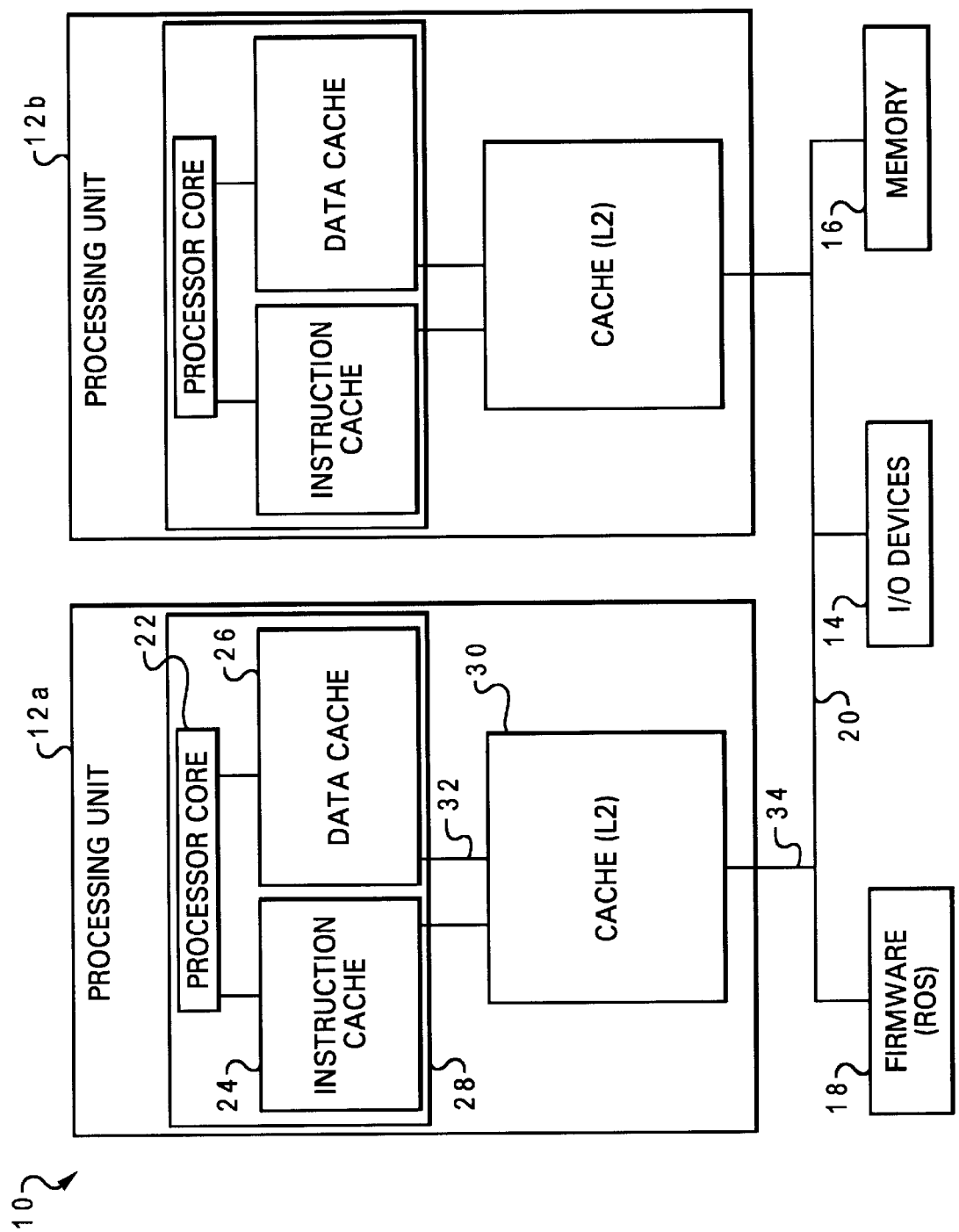
FIG. 1 is a block diagram of a prior art multi-processor computer system.
Figure 2:
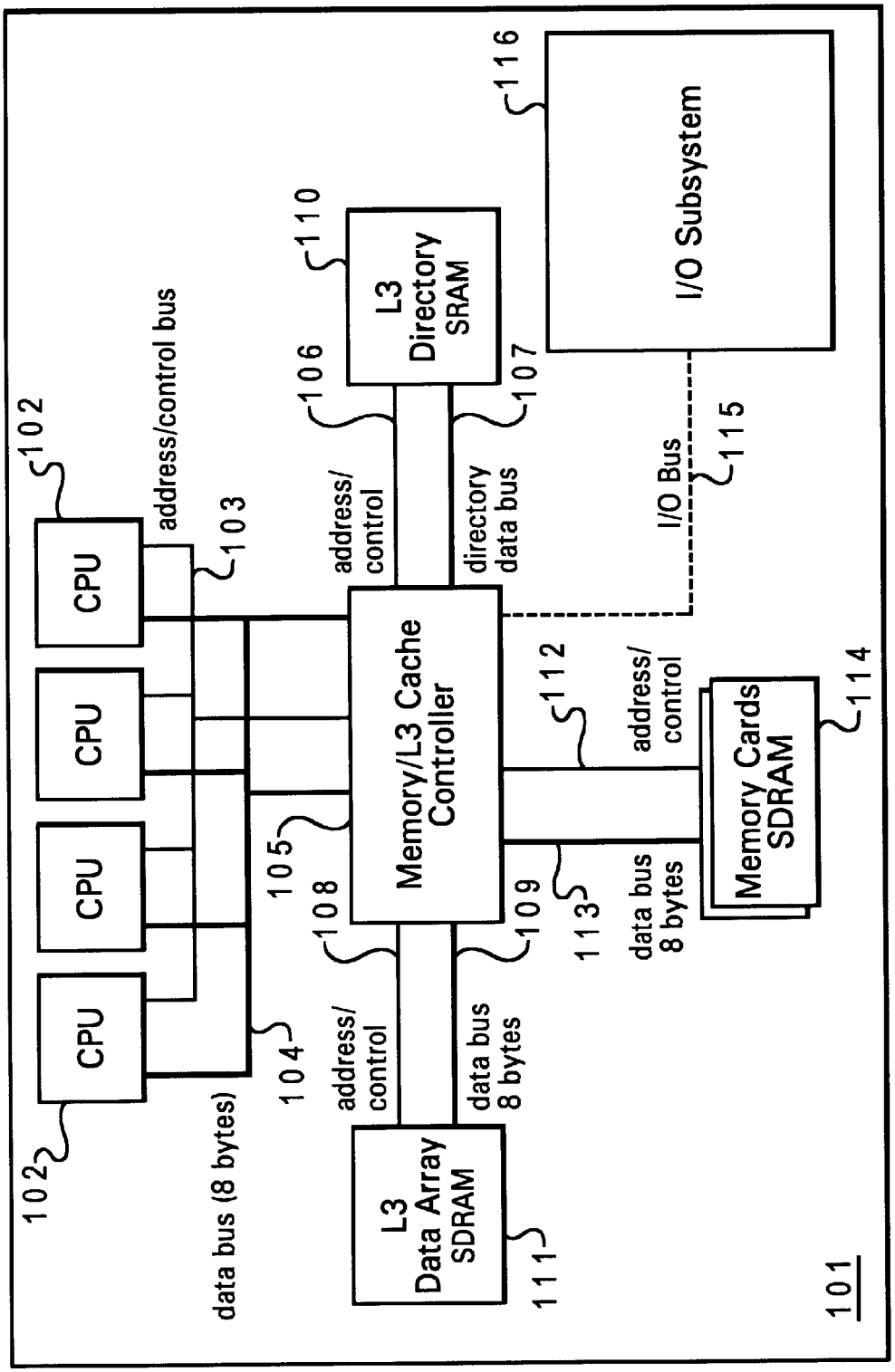
FIG. 2 is a block diagram of one embodiment of a multi-processor computer system constructed in accordance with the present invention, which allows for speculative accesses to an L3 cache using command aborts to reduce memory latency.

With reference now to the figures, and in particular with reference to FIG. 2, there is depicted one embodiment of a multi-processor computer system 101 constructed in accordance with the present invention, which allows for speculative accesses to an L3 cache using command aborts to reduce memory latency, that is, by aborting commands before the data transfer phase to prevent L3 misses and/or L2 modified data snoop hits from unnecessarily using L3 data bandwidth. FIG. 2 shows an SMP system 101 with four CPUs 102, a shared system address/control bus 103, and a shared system data bus 104. These buses connect to the memory/L3 controller 105 which in turn generates the L3 directory address/control bus 106, the L3 directory data bus 107, the L3 data array address/control bus 108, and the L3 data array data bus 109.

In the illustrative embodiment, an L3 directory 110 is comprised of static random access memory (SRAM), and interfaces to the L3 directory address/control bus 106 and data bus 107. The L3 data array 111 is comprised of synchronous dynamic random access memory (SDRAM) and interfaces to the L3 data array address/control bus 108 and data bus 109. The memory/L3 controller 105 generates a main memory address/control bus 112 and data bus 113 which interface to main memory cards 114 also comprised of SDRAM. Controller 105 further generates an input/output (I/O) bus 115 to which is connected the I/O subsystem 116.

Data array 111 is arranged in columns and rows, with a given piece of data (a memory word) being constructed of bits (cells) which all lie in the same row. A memory word is accessed using a row address strobe (RAS) signal which selects a particular row, and the column address strobe (CAS) signal which sequentially activates each column in the array. The memory words are formed from cache blocks corresponding to memory blocks in memory 114.

As explained below in conjunction with FIG. 3, SMP system 101 reduces main memory latency by providing speculative accessing of the L3 data array 111. The data transfer phase may be aborted to prevent L3 misses and/or L2 modified data snoop hits from unnecessarily using L3 data bandwidth. If the data transfer associated with a particular address is to be aborted (as dictated by the address compare and snoop response for that address), then a precharge command is also sent by the controller logic to the appropriate memory bank of the L3 data array (SDRAM) 111.

Figure 3:
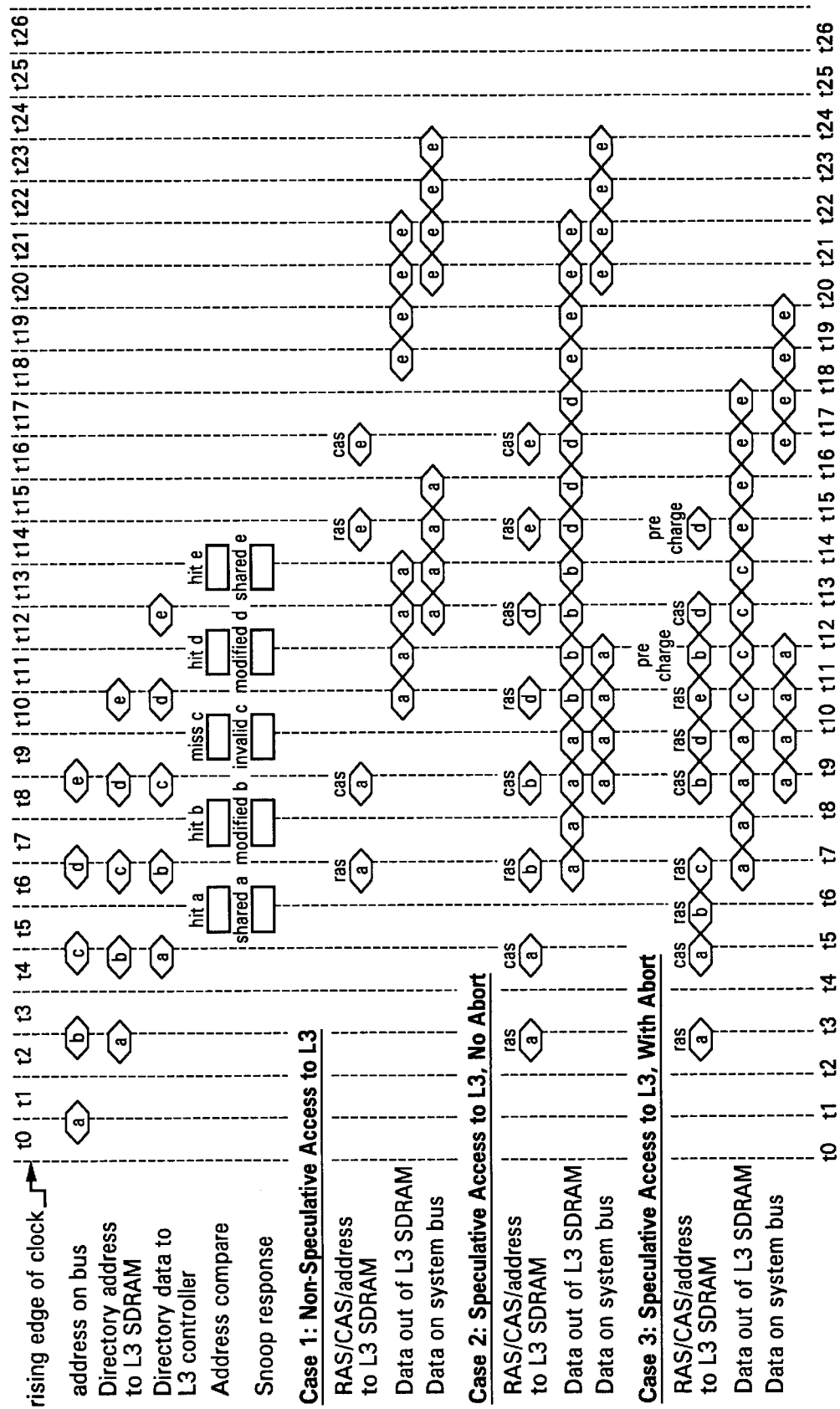
FIG. 3 is a timing diagram illustrating load operations initiated by the four central processing units (CPUs) of FIG. 2, comparing a first case of non-speculative L3 accesses to a second case of speculative accesses whereby the L3 data array is accessed immediately, and to a third case (which implements the present invention) of speculative accesses to the L3 whereby the data transfer can be aborted if the data is not needed, thereby saving data bandwidth.

FIG. 3 shows a timing diagram depicting load operations initiated by the four CPUs 102 in the system of FIG. 2. Three scenarios are compared. Case 1 illustrates non-speculative L3 accesses. Case 2 shows speculative accesses to the L3 cache whereby the L3 data array 111 is accessed as soon possible, and often before the snoop response and directory lookup results are known; once the row address is sent to the L3 data array 111, the resultant data transfer occurs, whether or not the data is needed. Case 3 (this invention) illustrates speculative accesses to the L3 cache, whereby the data transfer can be aborted if the data is not needed, thus saving data bus bandwidth.

In the example of FIG. 3, addresses can be driven every other cycle which is assumed to be the maximum rate. At time t0, address a is driven onto the system address/control bus 103 by one of the CPUs 102 (that is, by the L2 cache controller if the L2 cache structure is "in-line," or by the CPU bus interface unit if the L2 cache structure is "back door"). This address is latched into the memory/L3 controller 105 and the other CPUs 102 at time t1. Within the memory controller, it is assumed that the critical address path is two registers deep. Addresses and commands are queued when they cannot be executed immediately.

At time t2, a subset of address a is driven to the L3 directory 110. Data is driven by the directory 110 at time t4 and latched into the memory/L3 controller at time t5. The memory/L3 controller compares address a to the tag obtained from the directory 110 and determines whether there is a hit or miss. In this example, it is assumed that there is a hit, which means that the data associated with address a is stored in the L3 data array 111.

Also at time t4, the CPUs 102 drive their snoop responses onto the control portion of the address/control bus 103 which is latched by the memory/L3 controller at time t5 and evaluated as "shared" (the cache coherency protocol for the illustrative system is assumed to be modified, exclusive, shared, invalid, or MESI). Since the response is shared and there is a hit in the L3 cache, data will be provided by the L3 data array 111 via the memory/L3 controller 105 to the requesting CPU 102 via the system data bus 104.

Case 1

If L3 data accesses were non-speculative, then the memory/L3 controller 105 would wait until the snoop response and hit/miss conditions were determined before initiating the access to the SDRAM comprising the L3 data array 111. Thus, in cycle t6, the row address, RAS and other control signals are driven to the SDRAM. This example assumes a delay of 2 cycles between the RAS and the CAS, as well as a CAS latency of 2 cycles. CAS is driven by the memory/L3 controller 105 at time t8. Data is driven out of the SDRAM L3 data array 111 at time t10 and latched by the memory/L3 controller at time t11. Assuming a 2-register critical path for data in the memory controller, data appears on the system bus at time t12 and is latched by the CPU at time t13. It is further assumed that the cache line size in this example is 32 bytes, so data is provided in a burst of 4 consecutive transfers, each 8 bytes wide.

Address b, which is driven at time t2, is determined to hit the L3, but the snoop response indicates it is modified in another CPU's cache. Therefore, the data is to be sourced by the CPU owning the modified data, not the L3 111. In the non-speculative mode of operation, the controller does not access the L3 111, and thus does not busy the L3 data bus 109 or memory bank with an unnecessary transfer.

Address c is driven by a CPU 102 at time t4. It misses the L3 as well as the CPU L2 caches, thus resulting in a snoop response of "invalid". This data will be sourced by main memory 114 and not the L3 cache.

Address d is driven at time t6. The directory lookup results in a "hit", however the snoop response is "modified". Data is sourced by the CPU which has the modified data in its L2 cache.

Address e is driven at time t8. This address hits the L3 as well as in one or more CPU's L2 cache as "shared". In this case, the L3 sources the data at time t18, which results in a data transfer on the system bus 104 starting at time t20.

In summary, the latency from when an address is driven onto the system address/control bus 103 until data is driven onto the system bus 104 by the memory/L3 controller 105 is 12 cycles for address a and 12 cycles for address e.

Case 2

In case 2, the controller 105 does speculative accesses to the L3 data array 111. The row address, RAS, and controls for address a are driven at time t2 rather than waiting until t5 as above. Since address a hits in the L3 cache, data is driven onto the system data bus 104 by the controller at time t8 rather than t12, saving four cycles by speculatively accessing the L3 cache.

Address b also causes a speculative access, making the L3 data bus busy from cycles t10–t13. However, the line is determined to be modified in t7, so the data is discarded by the controller 105, since the modified data is to be sourced by the CPU owning the cache line.

Address c, which was driven by a CPU 102 at time t4, is determined at time t9 to miss the L3. In this case, there is sufficient time to prevent a speculative access to the L3, which would normally have occurred at time t10. Instead, the controller is able to issue a speculative access for address d at time t10. At time t11, the snoop response for address d indicates that this cache line is in the modified state in a CPU's L2 cache. Thus, the cache line for address d transferred in cycles t14–t17 is not used.

Address e is determined to hit the L3 at time t13. The row address and RAS are not asserted until time t14, since the L3 data bus is busy transferring the cache line for address d, which is to be discarded by the controller.

The latency for cache line a is improved from 12 cycles to 8 cycles due to the speculative L3 access. However, because of wasted data transfers, the latency for getting cache line e becomes equal to the non-speculative case, i.e., 12 cycles.

Case 3

Case 3 in FIG. 3 shows how average latency can be reduced by implementing speculative accesses to the L3, but aborting those which turn out to be unnecessary once the directory lookup has executed, in accordance with the present invention.

As in Case 2 above, the address a causes a speculative access to the L3 to obtain the cache line. The directory 110 indicates a hit and the snoop response is shared, so the L3 data is driven to the requesting CPU 102 at time t8.

At time t2, address b is driven by a CPU. The row address is ready to be driven (speculatively) to the L3 cache at time t4, however, there is contention with the column address a and CAS a during this time. The column address and CAS take precedence to minimize the latency for data associated with address a. The row address and RAS for address b are then driven at time t5. Since it is known at time t5 from the address compare that a data transfer is to occur for address a, the earliest time a column address/CAS can be driven for address b is t8. This frees up cycle t6 to speculatively drive row address/RAS for address c (although this timing sequence would occur in Case 2, it provides no benefit without the abort feature of the present invention, and so this sequence is omitted in Case 2 since it would just add complexity).

No commands are driven at time t7, since there are no outstanding addresses at this time. If the data transfer associated with address a were to be aborted (say, from an L3 miss or modified line), then a precharge command would be sent to the appropriate memory bank at this time.

At time t7 it is also determined that there will not be an L3 data transfer for address b, since the line is modified in a CPU's L2 cache. Thus, in cycle t8, a need to precharge the memory bank associated with address b is registered as a state in the controller 105.

At time t8, since the column address and CAS for address b are not asserted, the controller speculatively sends the column address and CAS for address c instead. This transmission results in a data transfer during t10–t13.

At time t9, the row address and RAS are speculatively driven for address d. It is also determined that c misses the L3 and thus the data transfer that is to occur in cycles t10–t13 is unnecessary, but unstoppable at this point. However, the wasted data transfers do not increase the latency of subsequent transfers.

At time t10, the row address and RAS are speculatively driven for address e (this is possible in part due to the advancing of RAS for address b to t5, and the subsequent advancing of RAS for address c to t6, as explained above).

In cycle t11, there are no outstanding addresses and therefore a precharge command is sent to the memory bank associated with address b. This closes the page and ultimately makes the bank available for a subsequent access. It is also determined that the cache line for address d is in a modified state in a CPU's L2 cache, and thus the need to precharge the bank associated with address d is registered in cycle t12.

At time t12, the controller speculatively sends the column address and CAS for address e, which results in data being driven onto the L3 data bus 109 during t14–t17. The controller does not speculatively send the column address and CAS for address d because the precharge state was registered for address d during cycle t12. Since address e hits in the L3 and is shared in one or more CPU's L2 cache, the data is driven onto the system bus 104 during t16–t19.

At time t14, the controller sends a precharge command to the memory bank associated with address d (this example assumes a 5-cycle minimum delay between activating RAS and issuing the precharge).

For Case 3, the latency to get the first 8 bytes of data for address a is 8 cycles, the same as in Case 2. The latency for the address e cache line is also 8 cycles, which is a 4 cycle improvement over Case 1 and Case 2. By aborting the data transfers associated with addresses b and d, the L3 data bus is freed up to allow the successful speculative access of cache line e. So, by utilizing more address/control bandwidth to speculatively access the L3 and send precharge commands as necessary for those commands which are not taken to completion, a significant latency reduction is achieved. It should be noted that the speculative accesses to the L3 SDRAM result in more banks becoming busy. However, this becomes less of a problem in large L3 designs comprised of, e.g., 4 bank SDRAM chips.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of controlling an L3 cache supporting at least one processing unit of a computer system, the method comprising the steps of:

requesting data by issuing an address associated with the data to an address/control bus;

initiating a transfer of the data by speculatively transmitting the address from the address/control bus to a data array of the L3 cache;

determining, after said initiating step, that the data is to be provided by a source other than the L3 cache;

in response to said determining step, registering a state for a memory bank in the data array associated with the address, indicating that the memory bank requires a precharge to make the memory bank available for a subsequent access; and aborting the data transfer in response to said determining step.

2. The method of claim 1 wherein:

the data array has contents which are arranged in rows and columns, and is accessed using a row address strobe (RAS) signal and a column address strobe (CAS) signal;

said initiating step includes the step of driving a RAS signal associated with the address; and said aborting step occurs prior to driving a CAS signal associated with the address.

3. The method of claim 1 wherein the address is a first address for the data which is first data, and said initiating step occurs while second data associated with a second address is being transferred from the data array of the cache on a data bus, and further comprising the step of transferring third data associated with a third address from the data array of the cache on the data bus immediately after completion of transfer of the second address.

4. The method of claim 1 wherein:

the cache has a plurality of banks; and said requesting step issues the address to the address/control bus of a particular one of the plurality of banks.

5. The method of claim 1 wherein said determining step includes the step of executing a lookup of a directory of the cache, to establish that the data associated with the address is not contained in the data array.

6. The method of claim 1 wherein:

the cache is an L3 cache supporting a plurality of processing units; and said requesting step issues the address from one of the processing units.

7. The method of claim 6 wherein said determining step includes the step of snooping a response from one of the processing units other than the particular processing unit, to establish that the data is held in a modified state in the other processing unit.

8. The method of claim 1 comprising the further step of sending a precharge command to the memory bank associated with the address.

9. A computer system comprising:

at least one processing unit;

a memory device, said cache means initiating a transfer of the data by speculatively transmitting an address associated with the data to said data array, in response to a request for the address, and said cache means further registering a state for a memory bank associated with the address, to indicate that said memory bank requires a precharge, in response to a determination that the data is to be provided by a source other than said cache means;

cache means for providing data to said processing unit, said cache means including a data array having a plurality of cache blocks for storing memory blocks corresponding to addresses of said memory device; and means for selectively aborting speculative accesses to said data array, wherein said aborting means aborts the data transfer and responds to the determination that the data is to be provided by the other source.

10. The computer system of claim 9 wherein:

said data array has contents are arranged in rows and columns, and is accessed using a row address strobe (RAS) signal and a column address strobe (CAS) signal;

said cache means initiates the data transfer by driving a RAS signal associated with the address; and said aborting means aborts the data transfer prior to driving a CAS signal associated with the address.

11. The computer system of claim 10 wherein said cache means dynamically determines whether to assert a RAS signal and a CAS signal of a subsequent transaction based on the aborted data transfer.

12. The computer system of claim 9 wherein:

the address is a first address for the data which is first data;

said cache means initiates the data transfer while second data associated with a second address is being transferred from said data array; and said cache means further transfers third data associated with a third address from said data array immediately after completion of transfer of the second address.

13. The computer system of claim 9 wherein said cache means has a plurality of banks, and the request issues the address to an address/control bus of a particular one of the plurality of banks.

14. The computer system of claim 9 wherein said cache means executes a lookup of a directory of said cache means, to establish that the data associated with the address is not contained in said data array.

15. The computer system of claim 9 wherein:

said cache means is an L3 cache supporting a plurality of processing units; and the request issues the address from one of the processing units.

16. The computer system of claim 15 wherein said cache means snoops a response from one of said processing units other than said particular processing unit, to establish that the data is held in a modified state in said other processing unit.

17. The computer system of claim 9 wherein said cache means further sends a precharge command to said memory bank associated with the address.

* * * * *